Aug. 26, 1941.  P. G. EXLINE  2,254,006
APPARATUS FOR TESTING WELL SAMPLES
Filed Nov. 10, 1938  4 Sheets-Sheet 1

Inventor
Paul G. Exline,
By G. M. Houghton
his Attorney

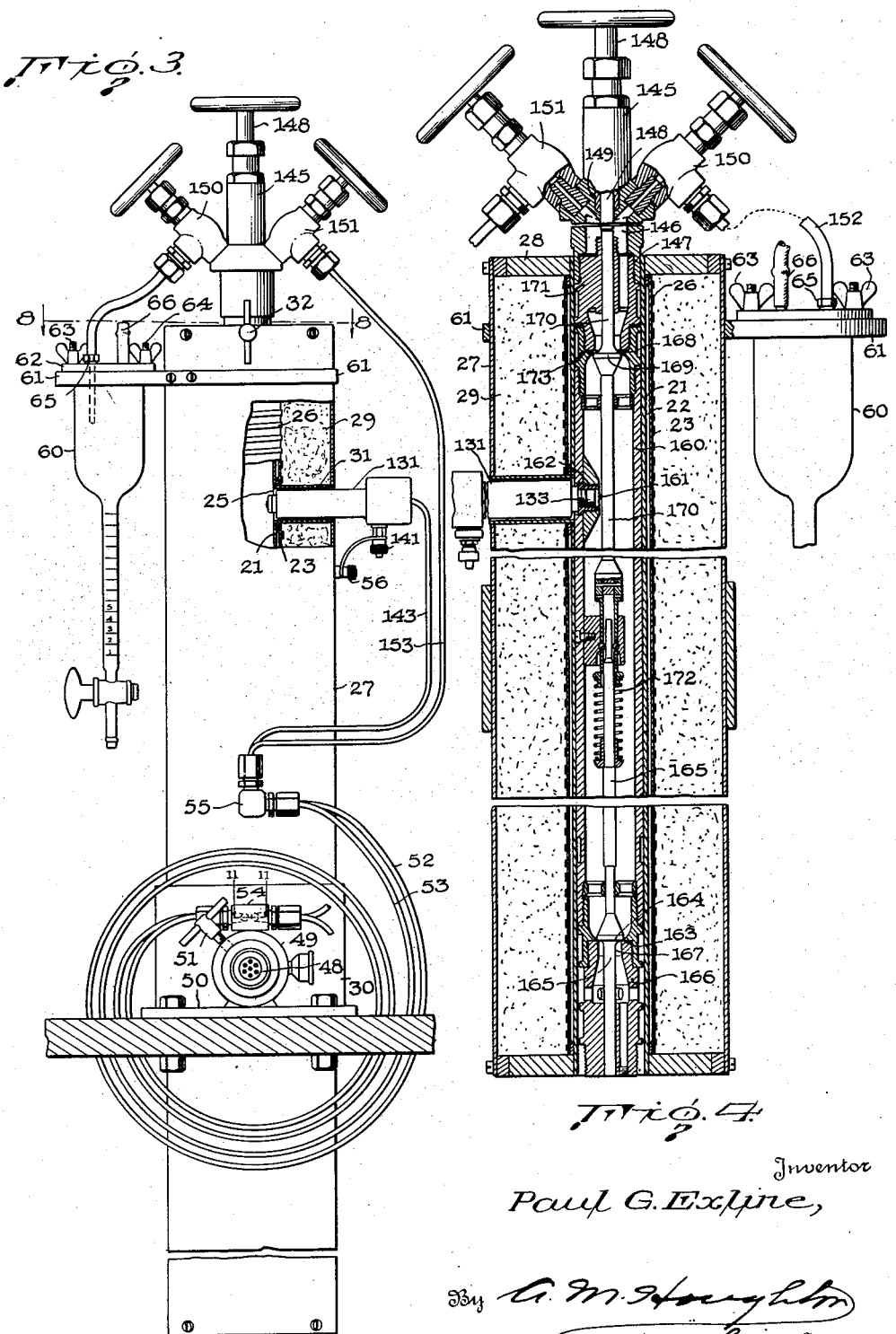

Inventor
Paul G. Exline,
By A. M. Houghton
his Attorney

Aug. 26, 1941.   P. G. EXLINE   2,254,006
APPARATUS FOR TESTING WELL SAMPLES
Filed Nov. 10, 1938   4 Sheets-Sheet 4
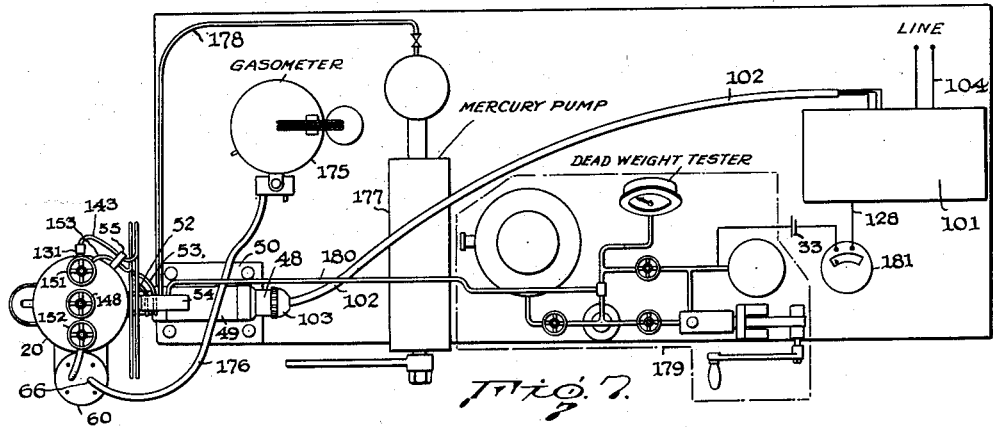
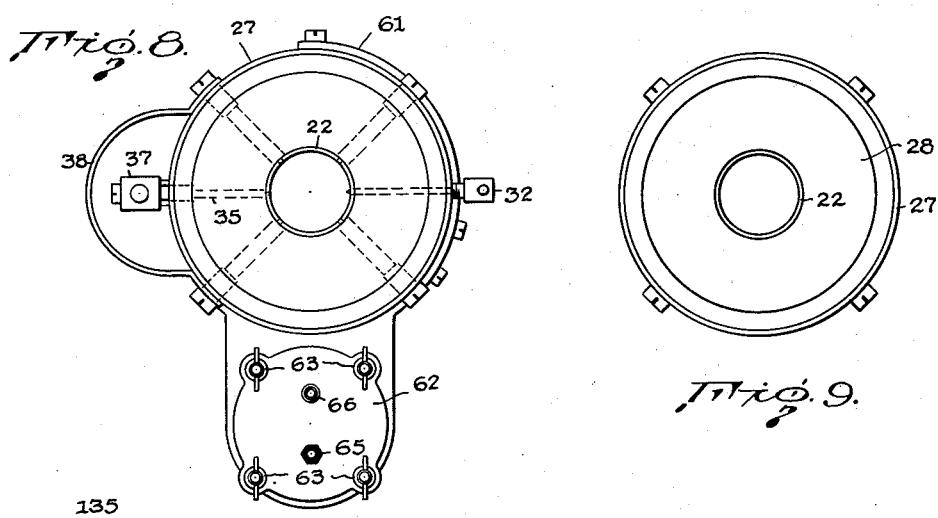
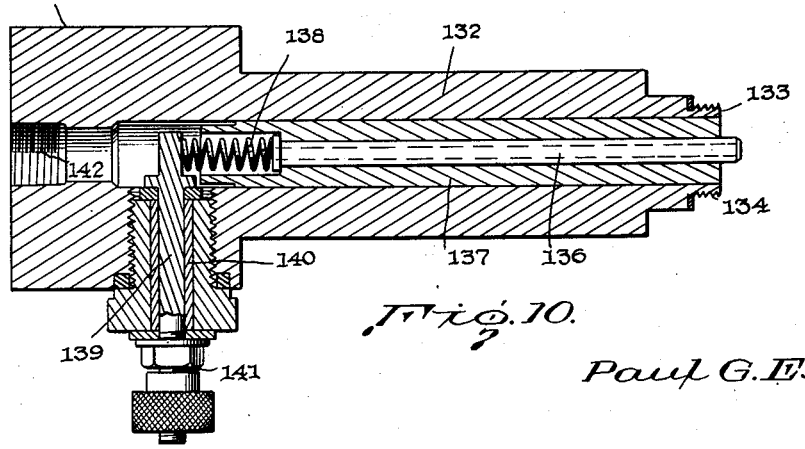
Inventor
Paul G. Exline,
By A. M. Houghton
Attorney Patented Aug. 26, 1941

2,254,006

UNITED STATES PATENT OFFICE 2,254,006

APPARATUS FOR TESTING WELL SAMPLES

Paul G. Exline, O'Hara Township, Allegheny County, Pa., assignor to Gulf Research & Development Company, Pittsburgh, Pa., a corporation of Delaware Application November 10, 1938, Serial No. 239,898

8 Claims. (Cl. 73—51)

This invention relates to apparatus for testing well samples; and it is particularly concerned with a tubular heater adapted to receive a well sampler, said tubular heater having electric heating elements and a thermostat comprising a fluid-containing chamber in contact with said heating elements, said chamber being provided with a fluid-actuated electrical contact switch connected through said heating elements with variable resistance current control means, said tubular heater being rotatably mounted midway of its length, in a mounting provided with a hollow axle adapted to carry the connections from said heating elements and thermostat to said variable resistance current control means; and with a well sample testing apparatus comprising said tubular heater in combination with a well sampler fixed therein, a bleeder head affixed to said sampler and provided with a central push rod and two needle valves, said sampler being provided with a valve adapted to be opened by said push rod, a graduated separator burette connected by a tube with one of said needle valves and by another tube to a gasometer, a mercury pump connected by a tube to the other needle valve, a pressure plug fixed in said heater in communication with a pressure-responsive means in said sampler, said pressure plug being provided with a hollow contact pin connected by a tube with a pressure-applying and measuring means, said pin forming an electric circuit through a volt-meter when in contact with said pressure-responsive means; all as more fully hereinafter set forth and as claimed.

In the petroleum industry, the importance of obtaining accurate data on the physical properties of reservoir fluids has been recognized for some time. These properties bear a definite relation to correct production practice and influence materially the design of flow strings and other production problems, as well as giving a basis for a reasonably accurate prediction of the changes the fluids, both gas and oil, in the pool will undergo throughout the life of the well. It is particularly important to know the changes in physical properties which may develop due to changes in pressure in the pool and in the flow string and the resultant changes in the amount and nature of gases dissolved in the oil.

Equipment designed to secure representative samples of reservoir fluids has been produced heretofore. One form of such equipment which has been found particularly satisfactory for this purpose, is the bottom hole well sampler described and claimed in U. S. Patent No. 2,099,080, of George W. Rusler, issued November 16, 1937.

The present invention provides an apparatus for use in conjunction with a sampler, such as the Rusler bottom hole well sampler, for examination of fluid samples under closely controlled conditions of temperature and pressure which may be adjusted to correspond to the conditions of temperature and pressure under which the sample was taken. Thus by means of the apparatus of this invention the sample may be tested in the original container, avoiding the necessity of transferring it from the sampler to another container, with the incident handling losses and resultant inaccuracies, which are an objection to a great many of the means heretofore used for this purpose. Furthermore the apparatus of this invention may be used in the field, thus eliminating the time usually lost in sending the sample to a laboratory distant from the production field and avoiding any necessity of using the sampler as a transportation container.

In describing this invention more in detail, reference will be had to the accompanying drawings showing one form of the apparatus of the invention designed for use in conjunction with a Rusler well sampler above referred to, in which—

Fig. 3 is a rear elevation partly in section of the tubular heater with the bleeder head, separator and pressure plug in position;

Fig. 4 is a front view in section of the tubular heater showing a Rusler bottom hole sampler in position with bleeder head and pressure plug attached;

Fig. 7 is a top plan view of the heater, bleeder head, and pressure plug assembled with the gasometer, mercury pump, dead weight tester, current control means and voltmeter;

Fig. 8 is a top plan view of the heater;

Fig. 9 is a bottom plan view of the heater;

Fig. 10 is a sectional view of the pressure plug; and

Figures 1, 2, 11:
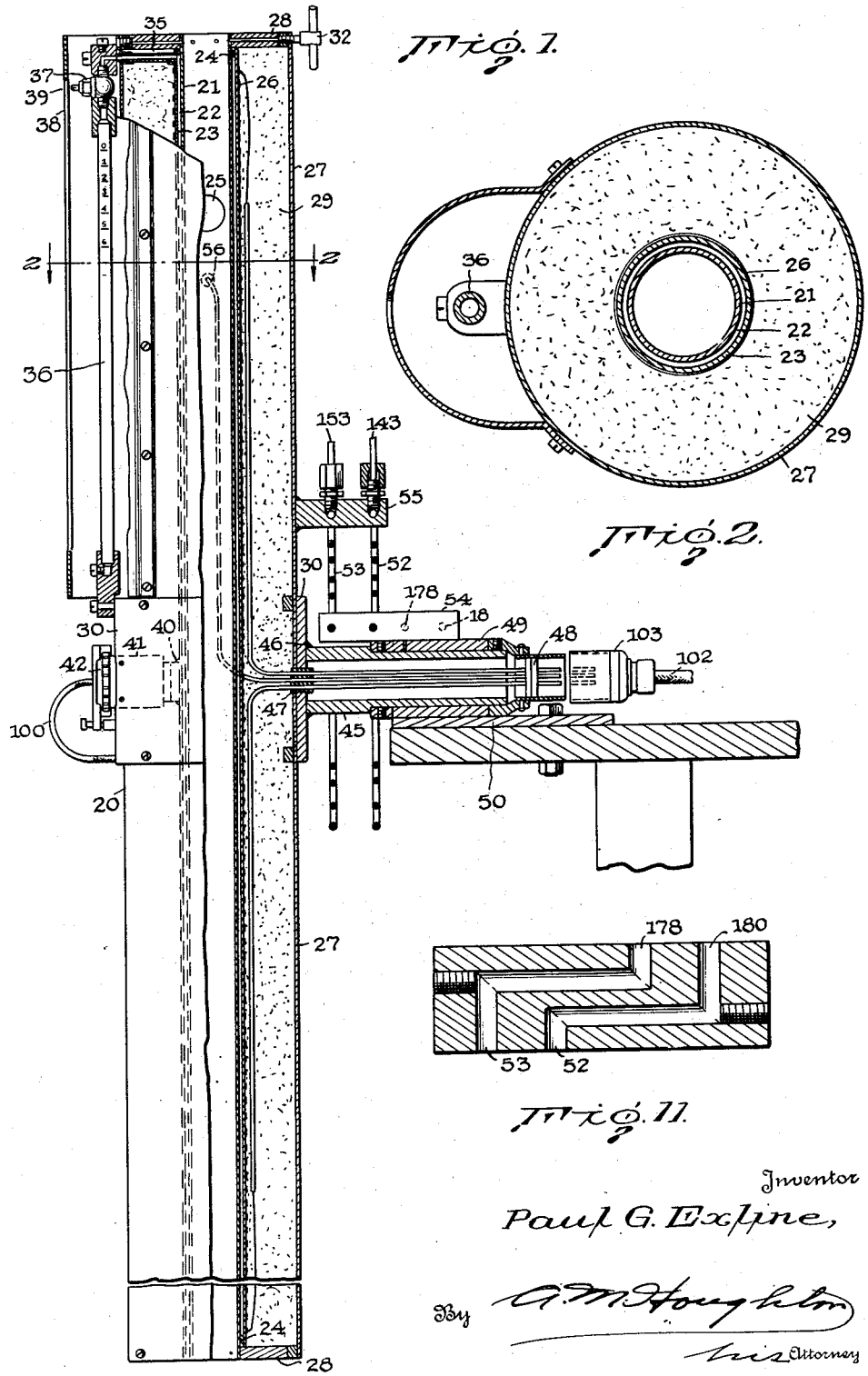
Fig. 1 is a side elevation partially in section of the tubular heater and mounting of the apparatus of this invention.
Fig. 2 is a sectional view along the line 2—2 of Fig. 1.
Fig. 11 is a sectional view of the drilled block 54 along the line 11—11 shown in Fig. 3.

The heater 20 shown in Figs. 1, 2 and 3 is formed of a central tubular heating chamber 21 adapted to receive and hold the well sampler. Surrounding the central heating chamber is an enclosed annular space 22 formed by the tubes 21 and 23 and rings 24. An opening 25 is provided in the heating chamber by coincident holes through the wall of the chamber and the surrounding tube 23. Sealing of the annular space 22 around opening 25 is maintained by a ring gasket between the tube 23 and the heating chamber 21. The outer tube 23 is electrically insulated on its outer surface by means of enamel, mica or the like and is helically wound with resistance wires 26. An outer casing formed of the tubular member 27, and end pieces 28 is affixed to collar 30 and provides an enclosed annular space 29 which is filled with heat-insulating material. A tube 31 (Fig. 3) connects the opening 25 in the heating chamber and a like opening in the outer casing and prevents escape of insulating material. A clamping screw 32 is provided for holding the sampler in place.

The annular space 22 between the chamber 21 and the tube 23 is hermetically sealed, and is filled with a heat-expansible fluid. At the top there is provided a tube 35, communicating with the calibrated burette reservoir or expansion chamber 36 through a needle valve 37, so that by opening valve 37 part of the expansible fluid in the annular space 22 may be caused to flow into the burette. By removing or adding a measured amount of fluid, the temperature at which the furnace will be maintained by the thermostat may be regulated. Burette 36 is affixed to the outer casing of the heater and protected by the sheathing 38 having the hole 39 opposite the needle valve. At another opening in the annular space 22, a boss 40 is affixed to the tube 23 and communicates with a chamber 41 in which is the thermostatic temperature control means 42, comprising a fluid-responsive electrical contact switch.

The collar 30, affixed to the outer casing 27 about midway of its length, is attached to the hollow axle 45 at 46 and is provided with an opening 47 through which the wires from the heating coils, binding post 56 and thermostat 42 pass to the electrical connection 48 at the end of the axle. The axle 45 is closely fitted in a bearing 49 mounted on the plate 50 adapted to be attached to a table or other horizontal support. A set screw 51 is provided in the rotary mounting, whereby the heater may be fixed in upright position. Two spiral coils of metal tubing 52 and 53 around the rotary mounting are connected at one end to the drilled block 54 mounted on the bearing 49, and at the other end to a drilled block 55 attached to the heater casing 27.

A separator burette 60 is mounted on the side of the heater casing near the top by means of the holder 61, plate 62 and clamps 63. This separator is provided at its top with two openings having tubing connections 65 adapted to be connected to bleeder head 145, and 66 adapted to be connected to a gasometer.

Figure 5:
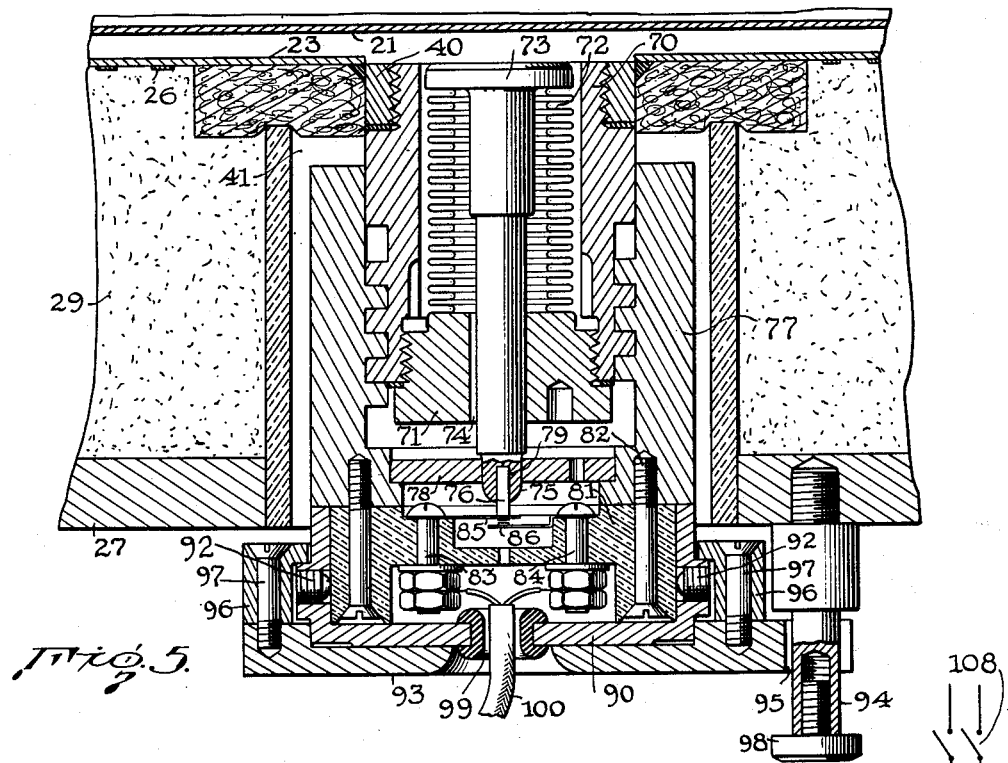
Fig. 5 is an enlarged sectional view of the thermostatic control means 42 shown in Fig. 1.

The thermostat 42 and its assembly with the tube 23 is illustrated in detail in Fig. 5. An externally threaded sleeve 70 is screwed into the boss 40, and is capped by the plug 71. A bellows 72 is fixed to the inner face of plug 71, and at the other end to a flanged rod 73, which is axially movable through the hole 74 in plug 71. The flanged rod is provided at its outer end with a neck portion 75 narrower than the main body of the rod and with an insulating tip 76. A sleeve 77 engages threads on the outer surface of the sleeve 70. A plate 78 is set in the sleeve 77 and is provided with a hole 79, through which the narrow neck 75 and the tip 76 of the rod 73 extend, and serves to restrict the distance the rod 73 may move. An insulating block 81 is affixed to the outer end of the sleeve 77 by the screws 82 and carries binding posts 83 and 84, to which are connected two leaves 85 and 86 which extend toward the center of the block 81 and overlap in spaced relation opposite the tip 76 of the rod 73. The travel of the rod 73 is so adjusted that the tip 76 will press the leaves 85 and 86 into electrical contact before axial motion of the rod is stopped by the plate 78. Greater or less travel may be permitted by rotating the sleeve 77 on the sleeve 70, so that the plate 78 is moved a greater or less distance from the plug 71. A relatively fine adjustment of the temperature at which the furnace will be maintained can be made by adjustment of the sleeve 77.

A metal cap 90 is attached to the outer face of the insulating block 81 by the screws 92. This cap has engraved on its outer face a dial indicating the position of the sleeve 77 and the permissible travel of the rod 73, consequently serving as a regulator. A fiduciary line is engraved on the plate 93, which is restrained from rotating by the pin 94 in the hole 95. The plate 93 is maintained in bearing relation to the metal cap 90 by the bearing ring 96 and screws 97. The pin 94 is capped with the screws 98 to prevent excessive travel of the plate 93. Plate 93 is provided with an opening 99 through which the conduit 100 passes, carrying the leads from the binding posts 83 and 84.

A current control box 101 (Fig. 7) containing resistances and a relay with suitable connections, is provided for use in conjunction with the heater 20 to regulate the current supplied to each of the coils in the heater. Control box 101 is supplied with a six wire cable 102, having a female plug connection 103 suitable for connection with the male plug 48 on the heater mounting, and with a cable 104 for attaching it to a source of 110 volt current.

Figure 6:
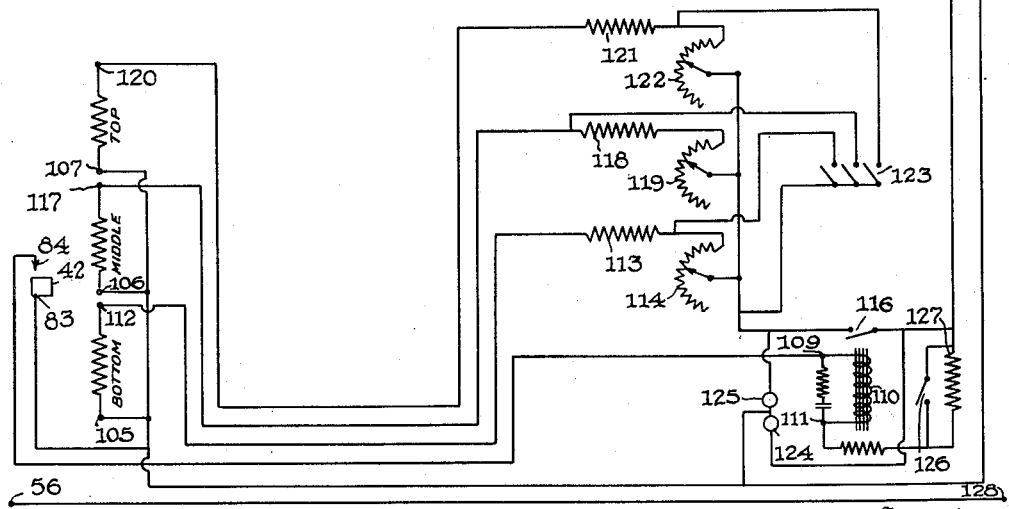
Fig. 6 is a wiring diagram of the heater, thermostat and current control means of the heater.

A wiring diagram of the connection to the coils and thermostat of the heater and the resistance and relay in the control box is shown in Fig. 6. The wiring in the heater is shown to the left, and the wiring in the control box is shown to the right of the diagram. The heating coils are indicated in the top, middle and bottom coils. The binding post 83 of the thermostat 42 is connected to one side of each of the three coils at 105, 106 and 107, and to the source of current through the switch 108. The binding post 84 of thermostat 42 is connected through suitable resistances to contact 109 of the relay 110, the other contact of which 111, is connected to the source of current through the switch 108. The end 112 of the bottom coil is connected through the fixed resistance 113, variable resistance 114, the relay switch 115 and the switch 108 to the source of current. The middle coil is connected from end 117 to fixed resistance 118, variable resistance 119, relay switch 115 and switch 108 to the source of current. The top coil is connected from end 120 to fixed resistance 121, variable resistance 122, relay switch 115 and switch 108 to the source of current. A three pole single throw shunt switch 123 is provided for shunting out resistances 114, 118, 119 and 122 when desired for rapid heating. Neon light 124 is suitably connected to glow when switch 108 is closed. Neon light 125 is suitably connected to glow when current is passing through the heater coils. A shunt switch 126 is provided for cutting out resistance 127 when alternating current is used. Binding post 56 on the side of the heater 20 is connected directly to a binding post 128 on the control panel.

A pressure plug 131 is provided, which is adapted to be inserted in sleeve 31 of the heater through opening 25 in the heating chamber and to be attached to the well sampler adjacent to the pressure sensitive diaphragm of the sampler. The pressure plug 131 of Fig. 4 shown in section in Fig. 10, consists of an annular casing 132 provided at one end with a narrow neck portion 133 having an external screw thread 134, and at the opposite end with an enlarged head portion 135. Within the casing member is a hollow pin 136, slidably mounted in the insulating block 137. A backing up spring 138 maintains the pin 136 in electrical contact with the member 139, which is insulated from the casing throughout its length by the packing 140, and carries on its outer end a binding post 141. A threaded opening 142 is provided, in which a tube 143 connecting to a pressure-applying and measuring means through the drilled block 55, coil 52 and drilled block 54 may be fixed. Pressure applied through the opening is transmitted through the hollow pin to the pressure-sensitive diaphragm of the well sampler, and serves to break the contact of the pin with the diaphragm.

A bleeder head 145 is also provided for use in conjunction with the heater. The bleeder head in use is affixed to the end of the well sampler, as shown in Figs. 3 and 4. It comprises a tubular chamber 146, having an open end provided with an internal screw thread 147 adapted to be threaded on the end of the sampler, and having at the other end a centrally located push rod 148 acting through the packing gland 149, and two needle valves 150 and 151 opening into the chamber 146, one of said needle valves being adapted to be connected to the separator burette 60 by a tube 152, while the other is connected to a mercury pump by a tube 153 through the drilled block 55, coil 53 and drilled block 54.

In Fig. 4 there is shown in longitudinal section the heater 20 of Fig. 1, pressure plug 131 and bleeder head 145, assembled with a well sampler 160 having a pressure-sensitive diaphragm 161 in the housing 162 into which the neck portion 133 of the pressure plug 131 is threaded. The sampler is a single tube provided at one end with a valve 167 comprising valve seat 163, knife edge 164 mounted on push rod 165 and valve guide 166 and at the other end with a valve 173 comprising valve seat 168, knife edge 169 mounted on push rod 170 and valve guide 171. These valves 167 and 173 are normally maintained in closed position by the spring assembly 172, and may be opened by pressure on the ends of the push rods 165 and 170. The bleeder head 145 is threaded on the end of the valve guide 171 with push rod 148 in contact with the end of push rod 170, so that valve 173 may be opened by means of push rod 148 to effect communication between sampler chamber 160 and chamber 146 of the bleeder head. Valve 151 from the bleeder head chamber is connected to separator 60 by tube 152 and valve 150 is connected to a mercury pump by tube 153, as described above.

In Fig. 7 there is shown the heater 20 assembled with the bleeder head, pressure plug and control box and connected to the testing apparatus including a gasometer, a mercury pump, a dead weight tester and a voltmeter. The gasometer 175 is connected to the connection 66 of the separator 60 by a tube 176. The mercury pump 177 is connected by a tube 178 to the drilled block 54 and from there through the coil 53, drilled block 55 and tube 153 to valve 151 of the bleeder head. The dead weight tester 179 is connected by the tube 180 to the drilled block 54, and from there through the coil 52, drilled block 55 and tube 143 to the pressure plug 131. The voltmeter 181 is connected by a lead to the binding post 128 in the control panel, which is connected through conduit 182 with binding post 56 on the heater jacket, which in turn is connected to binding post 141 of the pressure plug 131. The other lead from the voltmeter is connected to one pole of a low voltage source 33, the other pole of which is grounded by contact with any metallic part of the apparatus electrically connected with the body of plug 131.

In testing a sample of well fluid contained in a well sampler of the Rusler type using the apparatus of my invention, the bleeder head 145 is first threaded on one end of the sampler 171. Care must be taken in this operation to retract the central push rod 148 sufficiently to prevent contact with the protruding end of the rod 170 until the junction is completed. The sampler is then inserted in the heater chamber 21 with the pressure-sensitive diaphragm housing opposite the opening 25, and is fixed in position by means of the set screw 32. Valve 150 of the bleeder head is then connected up by the tube 65 to the separator burette 60. Valve 151 of the bleeder head is connected up by mercury pump 177. Pressure plug 131 is inserted in the opening 25 and is threaded into the housing 162 and is connected with the dead weight tester 179. Electrical connection from the pressure plug 131 to binding post 56 is also made.

With all the connections made and the valves 150 and 151 open, mercury is pumped into the chamber 146 until a few drops spill over into the separator 60, indicating that the chamber is full. When the sampler has reached bottom hole conditions of temperature and pressure, the valve 150 is closed and the heater jacket is rotated 180° to invert the sampler. With weight on the dead weight tester piston adjusted until the voltmeter indicates that the pressure differential is just sufficient to break contact between the diaphragm 161 of the sampler and pin 136 of the pressure plug, mercury is pumped into the bleeder head until contact between the diaphragm and the pin is re-established, as shown by the voltmeter, indicating that the mercury pressure in the bleeder head has opened the valve 173 and increased the pressure in the sampler. The bleeder head push rod 148 is then screwed in until the valve 173 is fully open and the mercury pump is backed off until the voltmeter needle just swings over, indicating the pressure in the sampler is the same as originally. The heater is then rotated 180° to bring the sampler to its original upright position. The sample is now ready for analysis.

The sample is then thoroughly mixed by rotating the heater jacket alternately in opposite directions through eight or ten half-turns and the initial pressure, initial mercury pump reading and the injected mercury volume are recorded. One cubic centimeter of mercury is then injected, the sample is again mixed and the new pressure, pump reading and mercury volume are recorded. This process is repeated until the injection of one cubic centimeter of mercury produces a large pressure increase, indicating that all the gas in the sample has been forced into solution. Additional injections of mercury give large pressure increases and after several additional readings above the saturation point, the first liberation is performed.

This liberation is of the flash type and is accomplished by maintaining the sample above the final injection pressure by continuous injection of mercury while bleeding the sample through valve 150 into separator 60. The amount of mercury to be pumped in, in this operation, is predetermined, and after it has been injected the bleeding is continued until the voltmeter pointer indicates that the pressure in the sampler is the same as at the start of the liberation. The volume of gas liberated is measured in the gasometer 175 and the volume of oil is measured in the separator burette 60 and both volumes are recorded.

A second portion of the sample is then liberated from the sampler into the separator burette. This liberation is of the differential type, in which valve 150 is opened slightly and the pressure in the sampler is reduced as the sampler fluid is liberated. The volumes of the gas and oil liberated are measured and recorded.

The same procedure is then repeated, including injecting mercury in measured increments until three or four measured injections have been made above the saturation point, a flash liberation and a differential liberation of a portion of the sample, all values being recorded as before. The process is continued until the sampler pressure has been reduced to atmospheric pressure.

The oil left in the sampler is measured by the difference between the sampler volume and the total volume of mercury injected. The sum of the oil left in the sampler and the total oil carried over in the flash and differential liberations is the total volume of oil in the sample. From the data thus obtained various important factors such as the saturation pressure of the well fluid, gas solubility and the like, may be determined.

Although I have described my invention particularly with reference to one form of apparatus which I have found suitable, it will be recognized that this apparatus may be modified in its details of construction, without departing from my invention, and I do not intend that the scope of my invention shall be limited to the structural details of the apparatus herein shown, except as defined in the appended claims.

What I claim is:

1. A well sample testing apparatus comprising a rotatably mounted tubular heater having a well sampler fixed therein, a bleeder head affixed to said sampler and provided with a control push rod and two needle valves, said sampler being provided with a valve adapted to be opened by said push rod, a graduated separator burette connected by a tube to one of said needle valves, and by another tube to a gasometer, a mercury pump connected by another tube to the other needle valve, a pressure plug fixed in said tubular heater in communication with a pressure-responsive means in said sampler, said pressure plug being provided with a hollow contact pin connected by a tube with a pressure-applying and measuring means, said pin forming an electrical circuit through a voltmeter when in contact with said pressure-responsive means in said sampler.

2. In a testing apparatus, a well sampler, heating means adapted to receive the well sampler said heating means being provided with temperature control means, a bleeder head on the sampler and a pressure plug adapted to be operatively connected to the sampler for indicating pressures therein while the sampler is in the heater, said heater being rotatably mounted about midway of its length.

3. Apparatus for testing samples of fluid comprising a container provided with valves and with a pressure responsive diaphragm, means for heating the container, valve operating means on the container, said last named means including a bleeder valve for removal of the contents of the container and a valve for introduction of fluid into the container, external pressure applying means affixed to said container coincident with said diaphragm, said means comprising an electrical contact element, and electrical indicating means in circuit with said diaphragm and contact element for indicating making and breaking of the circuit between the contact element and the diaphragm.

4. In testing apparatus, a well sampler, heating means adapted to receive the well sampler and provided with automatic temperature control, a bleeder head for said sampler, tubular connections between said bleeder head and a terminal on said heater, said heater being rotatably mounted midway of its length on a supporting member, terminal means on said supporting member and flexible tubular means connecting said terminals.

5. In well sample testing apparatus, a tubular heater mounted for rotatable movement about midway of its length, means for securing a receptacle containing the sample in said heater, electric heating elements in the heater, a thermostat including a fluid containing chamber in said heater, said chamber being positioned between the heating elements and the receptacle, an electrical contact switch operated by said thermostat and connected electrically in a circuit including said heating element and a variable resistance current control means, fluid pressure delivery means on the heater for delivery of fluid pressure to the receptacle and means for establishing electrical communication with the heater through said rotatable support.

6. Apparatus for testing samples of fluid comprising a valve container adapted to receive a sample of fluid to be tested, means in the side wall of the container responsive to the pressure of the fluid therein, a heater for the container, a thermostat in the heater for controlling the temperature thereof, said thermostat containing an expansible fluid, a burette, a conduit connecting the burette with the thermostat, said conduit being provided with a needle valve for controlled delivery of expansible fluid from the thermostat to the burette for determining operation of the thermostat, said heater being provided with an opening in the wall thereof opposite the pressure responsive means on the container and means adapted for connection with said pressure responsive means through the opening in the heater for determining the pressure of the fluid in the container.

7. In apparatus for testing fluid in a valved receptacle, a bleeder head adapted to be secured to said receptacle, said bleeder head being provided with means for opening the valve of the receptacle and with valve means for introduction and removal of fluid to and from the receptacle, a heater adapted to receive the receptacle, means on the heater for releasably securing the receptacle within the heater, a support for the heater, said heater being rotatably mounted about mid-way of its length on said support, a pipe coupling member secured to said heater, pipes connecting said member with the valves in the bleeder head, a pipe coupling member on said support, and means for establishing fluid communication between said pipe coupling members.

8. Apparatus for testing samples of fluid comprising a tubular heater mounted at a point about mid-way of its length for rotation in a vertical plane, a removable valved container in the heater, said container being adapted to receive a sample of fluid to be treated and being provided with a pressure responsive diaphragm, an opening in the heater adjacent the pressure responsive diaphragm, a fluid pressure gage, means connecting said gage through the opening in the heater with the pressure responsive diaphragm for determining pressure of fluid in the container, container valve operating means including valves for introduction and removal of fluid to and from the container, a conduit terminal on said heater, a conduit connecting said terminal with one of said valves, a conduit terminal on said rotatable mounting for the heater and conduit means connecting said terminals.

PAUL G. EXLINE.